(12) United States Patent
Lee et al.

(10) Patent No.: US 10,658,733 B2
(45) Date of Patent: *May 19, 2020

(54) MOBILE TERMINAL

(71) Applicant: LG ELECTRONICS INC., Seoul (KR)

(72) Inventors: Youngjoon Lee, Seoul (KR); Taemin Kwon, Seoul (KR); Sangmo Kim, Seoul (KR); Sooho Bang, Seoul (KR); Geunsu Lee, Seoul (KR); Kyujin Choi, Seoul (KR); Baekbong Pyo, Seoul (KR); Changho Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,278

(22) Filed: Apr. 12, 2019

(65) Prior Publication Data

US 2019/0237855 A1    Aug. 1, 2019

Related U.S. Application Data

(63) Continuation of application No. 15/865,380, filed on Jan. 9, 2018.

(30) Foreign Application Priority Data

May 2, 2017    (KR) .................. 10-2017-0056485

(51) Int. Cl.
*H04B 1/10*    (2006.01)
*H04B 1/38*    (2015.01)
(Continued)

(52) U.S. Cl.
CPC ........... *H01Q 1/243* (2013.01); *H01Q 1/2291* (2013.01); *H01Q 1/24* (2013.01); *H01Q 1/245* (2013.01);
(Continued)

(58) Field of Classification Search
CPC ...... H01Q 1/243; H01Q 5/371; H01Q 1/2291; H01Q 1/245; H01Q 1/38; H01Q 1/48;
(Continued)

(56) References Cited

U.S. PATENT DOCUMENTS

8,849,217 B2    9/2014    Rousu et al.
8,929,838 B2    1/2015    Klomsdorf et al.
(Continued)

*Primary Examiner* — Pablo N Tran
(74) *Attorney, Agent, or Firm* — Birch, Stewart, Kolasch & Birch, LLP (57) ABSTRACT

A mobile terminal can include a terminal body having a display unit disposed on one surface thereof; a frame supporting the display unit; a metal member spaced apart from the frame and exposed to an outside of the mobile terminal; a plurality of connecting members connecting the metal member to the frame and grounding the metal member; and an antenna unit disposed adjacent to the frame and including a radiator configured to radiate wireless signals in a first frequency band, in which the metal member is divided into specific areas by the plurality of connecting members, and one area located adjacent to the radiator, is configured to generate a parasitic resonance at a second frequency band different from the first frequency band, and the plurality of connecting members connected to the metal member are spaced apart from one another at different intervals.

11 Claims, 10 Drawing Sheets

(51) Int. Cl.
*H04Q 1/24* (2006.01)
*H04M 1/02* (2006.01)
*H01Q 1/24* (2006.01)
*H01Q 1/38* (2006.01)
*H01Q 1/22* (2006.01)
*H01Q 1/48* (2006.01)
*H01Q 9/14* (2006.01)
*H01Q 9/42* (2006.01)
*H01Q 21/28* (2006.01)
*H01Q 5/371* (2015.01)

(52) U.S. Cl.
CPC ................ *H01Q 1/38* (2013.01); *H01Q 1/48* (2013.01); *H01Q 5/371* (2015.01); *H01Q 9/145* (2013.01); *H01Q 9/42* (2013.01); *H01Q 21/28* (2013.01); *H04M 1/02* (2013.01); *H04M 1/026* (2013.01); *H04M 1/0266* (2013.01)

(58) Field of Classification Search
CPC .......... H01Q 9/145; H01Q 9/42; H01Q 21/28; H01Q 1/24; H04M 1/026; H04M 1/0266; H04M 1/02
See application file for complete search history.

(56) References Cited

U.S. PATENT DOCUMENTS

| | | | | |
|---|---|---|---|---|
| 9,197,270 | B2* | 11/2015 | Ying | H04B 1/3827 |
| 9,252,494 | B2 | 2/2016 | Hayashi et al. | |
| 9,350,081 | B2* | 5/2016 | Heikura | H01Q 1/245 |
| 9,761,951 | B2 | 9/2017 | Kuonanoja | |
| 9,972,891 | B2 | 5/2018 | Ayala Vazquez et al. | |
| 9,973,228 | B2* | 5/2018 | Heikura | H04B 1/3838 |
| 10,014,582 | B2* | 7/2018 | Ryu | H01Q 1/243 |
| 10,033,097 | B2* | 7/2018 | Desclos | H01Q 1/243 |
| 10,084,497 | B2 | 9/2018 | Choi | |
| 10,224,606 | B2* | 3/2019 | Kim | H01Q 1/243 |
| 2009/0174604 | A1 | 7/2009 | Keskitalo et al. | |
| 2012/0229360 | A1 | 9/2012 | Jagielski et al. | |
| 2014/0323063 | A1 | 10/2014 | Xu et al. | |
| 2015/0171916 | A1 | 6/2015 | Asrani et al. | |
| 2015/0188210 | A1 | 7/2015 | Asrani et al. | |
| 2018/0287246 | A1* | 10/2018 | Kim | H01Q 1/243 |
| 2018/0375193 | A1* | 12/2018 | Zhang | H01Q 1/243 |
| 2018/0375194 | A1* | 12/2018 | Zhang | H01Q 1/243 |
| 2019/0058244 | A1* | 2/2019 | Kim | H01O 13/10 |
| 2019/0067801 | A1* | 2/2019 | Kang | H01Q 1/245 |

* cited by examiner

MOBILE TERMINAL

CROSS-REFERENCE TO RELATED APPLICATIONS

This application is a Continuation of U.S. patent application Ser. No. 15/865,380, filed on Jan. 9, 2018, which Pursuant to 35 U.S.C. § 119(a), claims the benefit of an earlier filing date of and the right of priority to Korean Application No. 10-2017-0056485, filed on May 2, 2017, all of which are hereby expressly incorporated by reference into the present application.

BACKGROUND OF THE INVENTION

1. Field of the Invention

The present invention relates to a mobile terminal equipped with an antenna unit.

2. Background of the Invention

Terminals may be divided into mobile/portable devices and stationary devices according to mobility. Also, the mobile devices may be classified into handheld types and vehicle mount types. The terminals have various functions according to development of technologies. For example, a mobile terminal can capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

In recent years, as the functions of the mobile terminal have diversified, a plurality of antennas are disposed adjacent to an edge of a terminal body. However, when a hand is adjacent to an antenna unit, it causes deterioration of performance of the antenna unit.

SUMMARY OF THE INVENTION

An aspect of the present invention is to obviate the above-mentioned problem and other drawbacks, namely, to minimize performance degradation of an antenna due to a hand effect by way of using a metal beam.

To achieve these and other advantages and in accordance with the purpose of this specification, as embodied and broadly described herein, there is provided a mobile terminal, including a terminal body having a display unit disposed on one surface thereof, a frame supporting the display unit, a metal member spaced apart from the frame, exposed to outside and formed in a beam shape, a plurality of connecting members connecting the metal member to the frame so that the metal member is grounded, and an antenna unit disposed adjacent to the frame and provided with a radiator that realizes a first frequency band, and a feeder that feeds the radiator, wherein one area of the metal member, divided into specific areas by the plurality of connecting members and located adjacent to the radiator, generates parasitic resonance at a second frequency band different from the first frequency band, and wherein a frequency band of the antenna unit is shifted to a third frequency band including the first frequency band by the metal member and the radiator when the dielectric is adjacent to the metal member.

According to an embodiment of the present invention, a metal member exposed to outside of a mobile terminal can be grounded to a frame, to set a frequency band of parasitic resonance to be different from a frequency band of an antenna unit, thereby minimizing an affection of the parasitic resonance. Also, when a dielectric is adjacent to the antenna unit, resonance is generated at frequency band including the frequency band of the antenna due to a movement of the frequency band of the metal member, thereby minimizing deterioration of the antenna performance due to a hand effect.

In addition, since a flexible circuit board is connected to set the frequency band of the metal member, a physical length can be adjusted, and a connecting member to be mounted can be minimized, thereby facilitating assembling of components and minimizing a weight of the mobile terminal.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components can be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
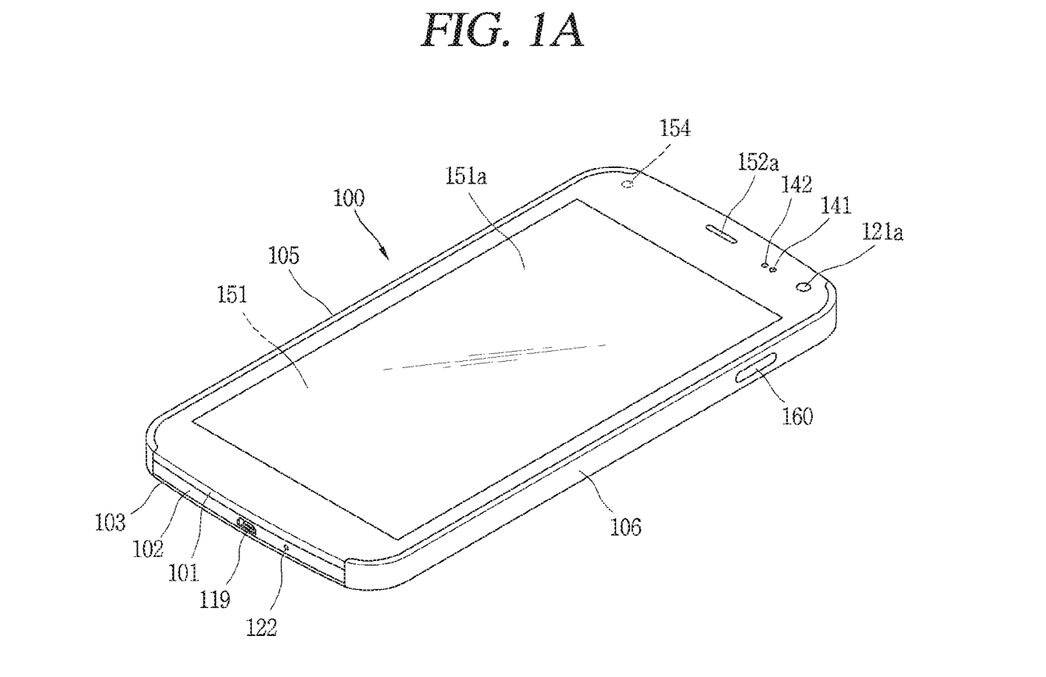
FIGS. 1A and 1B are views of a mobile terminal according to one embodiment of the present invention, viewed from different directions.
Figure 1B:
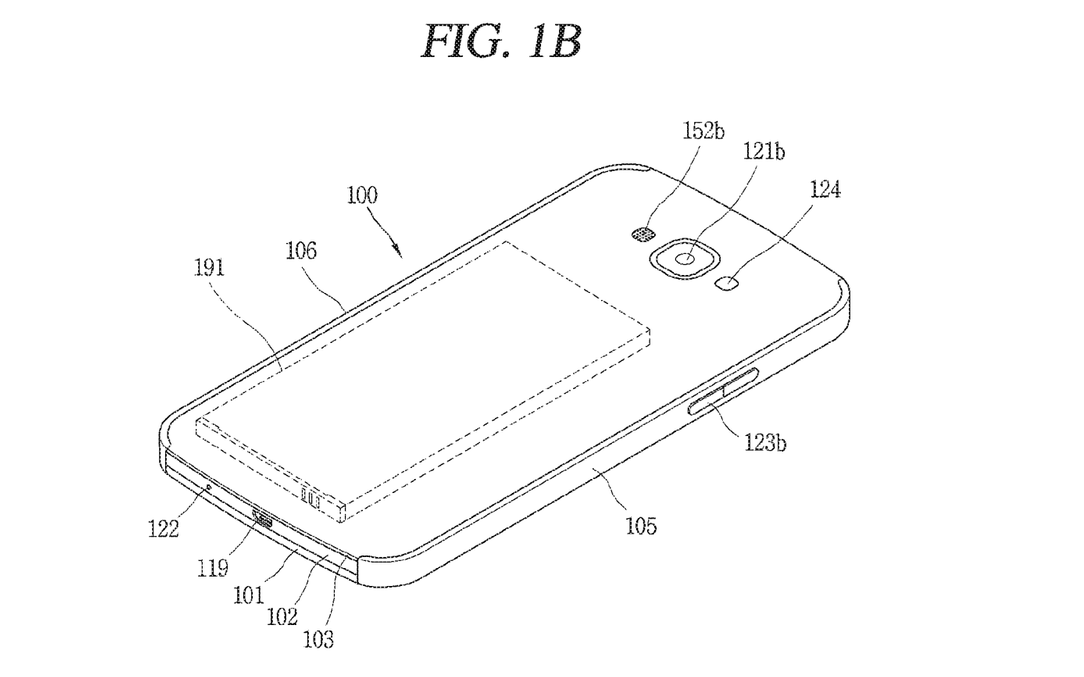

FIGS. 1A and 1B are views of a mobile terminal according to one embodiment of the present invention, viewed from different directions. Referring to FIGS. 1A and 1B, the mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. In this instance, a rear cover 103 is shown covering the electronic components, and this cover can be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. In addition, the rear cover 103 may include an opening for externally exposing a camera 121b or an audio output module 152b.

The cases 101, 102, 103 can be formed by injection-molding synthetic resin or can be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this instance, a mobile terminal 100 having a uni-body is formed so synthetic resin or metal extends from a side surface to a rear surface.

In addition, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

As shown, the mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1A and 1B, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executed on the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be designated.

Further, the touch sensor may be configured in a form of a film having a touch pattern and disposed between a window and a display (not illustrated) on a rear surface of the window, or may be a metal wire directly patterned on the rear surface of the window. Alternatively, the touch sensor can be formed integrally with the display. For example, the touch sensor can be disposed on a substrate of the display, or can be provided inside the display.

In this way, the display unit 151 may form a touch screen together with the touch sensor, and in this instance, the touch screen may function as a user input unit. In some cases, the touch screen may replace at least some of functions of a first manipulation unit 123a. Hereinafter, for the sake of explanation, the display unit (display module) for outputting the image and the touch sensor are collectively referred to as a touch screen 151.

The first audio output module 152a may be implemented as a receiver for transmitting a call sound to a user's ear and the second audio output module 152b may be implemented as a loud speaker for outputting various alarm sounds or multimedia playback sounds. The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this instance, a hole independently formed to output audio sounds may not be seen or may otherwise be hidden in terms of appearance, thereby further simplifying the appearance of the mobile terminal 100.

The optical output module 154 can output light for indicating an event generation. Examples of such events may include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b can employ any method if it is a tactile manner allowing the user to perform manipulation with a tactile feeling such as touch, push, scroll or the like The first and second manipulation units 123a and 123b may also be manipulated through a proximity touch, a hovering touch, and the like, without a user's tactile feeling.

The drawings illustrate the first manipulation unit 123a is a touch key, but the present disclosure is not limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit can be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit can be disposed to overlap the display unit 151 of the front surface in a thickness direction of the terminal body. As one example, the rear input unit can be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 can be formed to receive the user's voice, other sounds, and the like. The microphone 122 can be provided at a plurality of places, and configured to receive stereo sounds. The interface unit 160 may serve as a path allowing the mobile terminal 100 to interface with external devices.

For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

A flash 124 can be disposed adjacent to the second camera 121b. When an image of a subject is captured with the camera 121b, the flash 124 can illuminate the subject. The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication can be disposed on the terminal body. The antenna can be embedded in the terminal body or formed in the case. For example, an antenna which configures a part of the broadcast receiving module 111 (see FIG. 1A) can be retractable into the terminal body. Alternatively, an antenna can be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a battery 191 which is mounted in the terminal body or detachably coupled to an outside of the terminal body.

The battery 191 can receive power via a power cable connected to the interface unit 160. Also, the battery 191 may be (re)chargeable in a wireless manner using a wireless charger. The wireless charging can be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear cover 103 can be detachably coupled to the rear case 102.

An accessory for protecting an appearance or assisting or extending the functions of the mobile terminal 100 can further be provided on the mobile terminal 100. As one example of the accessory, a cover or pouch for covering or accommodating at least one surface of the mobile terminal 100 can be provided. The cover or pouch may cooperate with the display unit 151 to extend the function of the mobile terminal 100. Another example of the accessory may be a touch pen for assisting or extending a touch input onto a touch screen.

One area of the case forming the outer appearance of the mobile terminal 100 according to one embodiment of the present invention may be made of a metal material. When the one area of the case is made of the metal material, a luxurious appearance and durability of the mobile terminal can be improved.

Figure 2A:
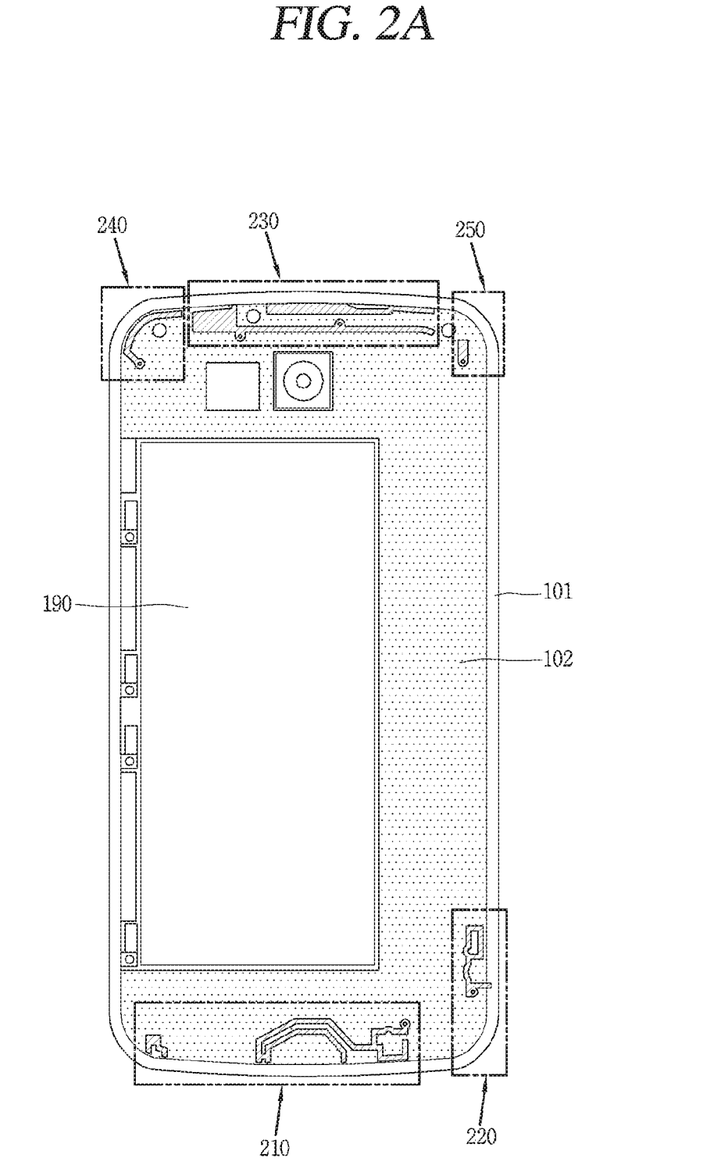
FIG. 2A is a conceptual view illustrating a rear surface of a mobile terminal with a rear case exposed, in accordance with one embodiment of the present invention.

The mobile terminal according to an embodiment of the present invention includes a plurality of antenna units for transmitting and/or receiving a wireless signal. For example, as shown in FIG. 2A, the mobile terminal 100 can include first to fifth antenna units 210, 220, 230, 240 and 250 disposed adjacent to edges and/or corners of the terminal body. The first to fifth antenna units 210, 220, 230, 240 and 250 include radiators that radiate at a predetermined frequency band. When the radiator is disposed adjacent to one area of the metal case, the case can perform a radiation function at a specific frequency band.

However, radiation areas of the radiators of the first to fifth antenna units 210, 220, 230, 240 and 250 disposed adjacent to the edge areas of the terminal body may change when an object such as a hand is located adjacent to (approaches) the case, and accordingly the frequency band changes. Hereinafter, description will be given of a structure for minimizing deterioration of a wireless performance due to a contact with a hand or the like, by adjusting a parasitic resonance frequency band of a metal member of the case adjacent to the antenna unit.

In more detail, FIG. 2A is a conceptual view illustrating a rear surface of a mobile terminal with the rear case 102 exposed, in accordance with one embodiment of the present invention. In particular, FIG. 2A illustrates the rear case 102 from which the battery cover 103 is separated. As shown, the rear case 102 has a space in which the power supply unit 190 can be mounted. Antenna patterns forming the radiators of the first to fifth antenna units 210, 220, 230, 240 and 250 can be formed in one area of the rear case 102.

For example, the antenna pattern of the first antenna unit 210 is implemented to radiate wireless signals at a low frequency band (about 700 MHz to about 1 GHz) and at a high frequency band (2.3 GHz or more). The antenna pattern of the second antenna unit 220 is implemented to radiate wireless signals at a middle frequency band (about 1.6 GHz to about 2.3 GHz), and the antenna pattern of the third antenna unit 230 is implemented to radiate wireless signals in the range from the low frequency band to the high frequency band.

The antenna patterns of the first to third antenna units 210, 220 and 230 are not electrically connected to the metal case. However, the antenna patterns of the fourth and fifth antenna units 240 and 250 may be connected to the metal case. For example, the antenna pattern of the fourth antenna unit 240 is connected to a first metal member 105 (see FIG. 2B) and receives a GPS signal. In addition, the antenna pattern of the fifth antenna unit 250 is connected to the second metal member 106 (see FIG. 2B) and performs WiFi (2.4G, 5.0G) communications.

Further, the first and second antenna units 210 and 220 can be disposed in a lower end portion of the terminal body, and the third, fourth and fifth antenna units 230, 240 and 250 can be disposed in an upper end portion of the terminal body which is subject to a relatively less hands effect due to the user's grip. In addition, the first to fifth antenna units 210, 220, 230, 240 and 250 can be spaced apart from one another to maximize the radiation function. Also, the antenna patterns can be disposed on an upper surface or a lower surface of a frame 104, and a shape and length of each pattern is decided according to a preset bandwidth.

Figure 2B:
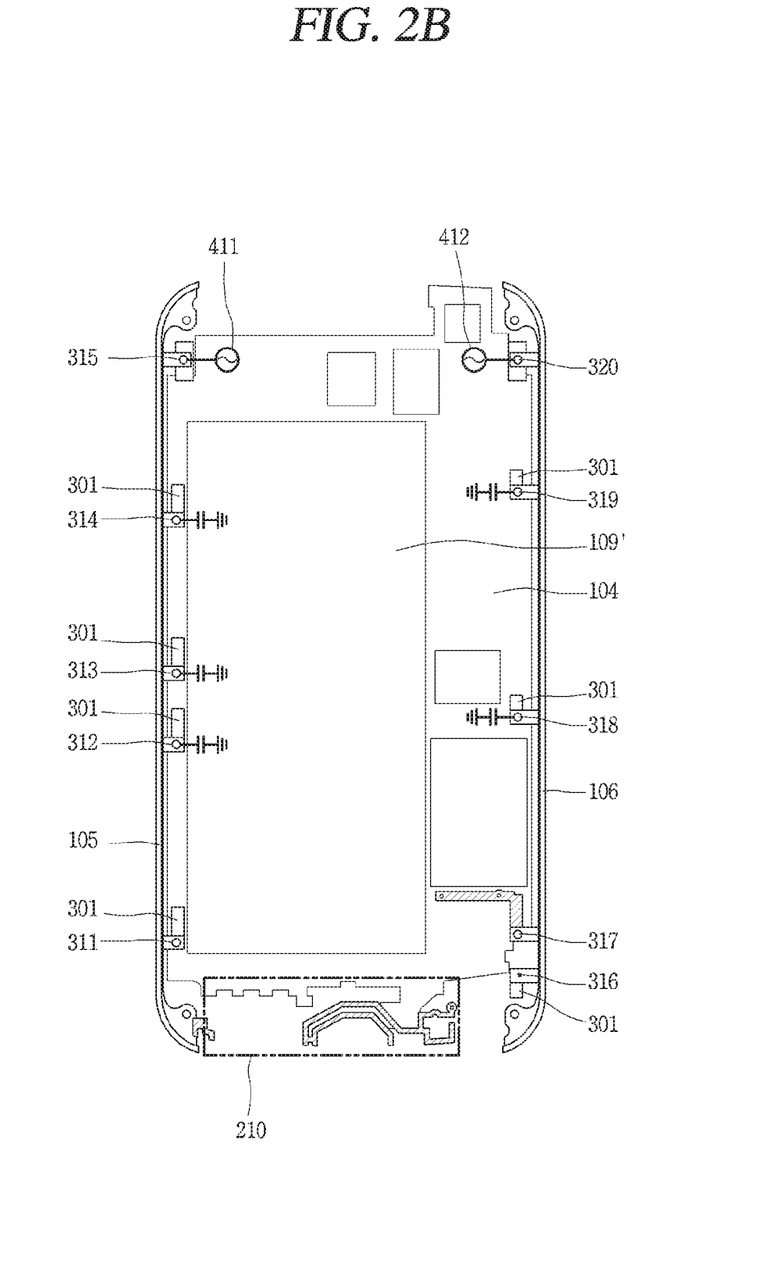
FIG. 2B is a conceptual view illustrating a frame fixed with metal members.

Next, FIG. 2B is a conceptual view illustrating the frame 104 fixed with metal members 105 and 106. Referring to FIGS. 2A and 2B, the frame 104 can support a rear surface of the display unit 151. The frame 104 can also be configured into any size and shape if it provides a space sufficient to accommodate the antenna units to be disposed in the upper and lower end portions of the mobile terminal 100, and is not limited to a specific component name. Therefore, the frame 104 can be the front case 101 (see FIG. 1B).

The mobile terminal 100 according to this embodiment includes the display unit 151, the frame 104 supporting the display unit 151, a printed circuit board 181 disposed on a rear surface of the frame 104 (FIGS. 6A and 6B), the rear case 102 disposed on a rear surface of the printed circuit board 181, and beam-shaped first and second metal members 105 and 106 disposed on both sides of the frame 104 in a spaced manner, and exposed to an outside of the terminal body.

The frame 104 also includes an accommodation area 109' in which the power supply unit 190 is mounted. In addition, the frame 104 can include a plurality of mounting holes or mounting grooves for mounting electronic components therein or therethrough. In this embodiment, the first and second metal members 105 and 106 define a side appearance of the mobile terminal 100, thereby achieving an attractive appearance design.

Referring to FIG. 2B, the first and second metal members 105 and 106 are connected to the frame 104 by a plurality of connecting members. Alternatively, the frame 104 made of a metal material and the first and second metal members 105 and 106 may be integrally formed with each other. That is, the first and second metal members 105 and 106 exposed to the outside can correspond to one area of an edge of the frame 104. In this instance, slits for dividing the frame 104 into specific areas, and insulating portions formed in the slits can be provided.

For example, the first and second metal members 105 and 106 are electrically connected to the frame 104 by first to tenth connecting members 311, 312, 313, 314, 315, 316, 317, 318, 319 and 320. Each of the connecting members can be provided with a protruding area protruding from the first or second metal member 105, 106 and including a hole, and a coupling screw fixed to the frame 104 through the hole.

Also, each area of the first and second metal members 105 and 106 is fixed to the frame 104 by the protruding area and the coupling screw, and is electrically connected to a main circuit board to be grounded. The first and second metal members 105 and 106 can function as the radiators, which radiate wireless signals at specific frequency bands, by a physical length of each of a plurality of areas thereof, which are divided based on each position of the first to tenth connecting members 311, 312, 313, 314, 315, 316, 317, 318, 319 and 320.

When the frame 104 is formed integrally with the first and second metal members 105 and 106, one area of the frame 104 is connected to the main circuit board and grounded. The first, second, third, fourth, sixth, eighth and ninth connecting members 311, 312, 313, 314, 316, 318 and 319 are connected to an LC matching element 301. The LC matching element 301 generates a resonance for selectively filtering the frequency band. Characteristic impedance is formed by the LC matching element 301, which affects a resonance characteristic.

Accordingly, an electric length of a transmission line of the radiator generating the resonance can be changed, thereby adjusting the frequency band. The protruding area of the first metal member 105 can be electrically connected to the LC matching element 301. Also, one area of the front case 101 or the rear case 102 constituting the side surface of the terminal body includes an accommodation area for accommodating the LC matching element 301, and a stepped structure for supporting the protruding area.

Figure 3:
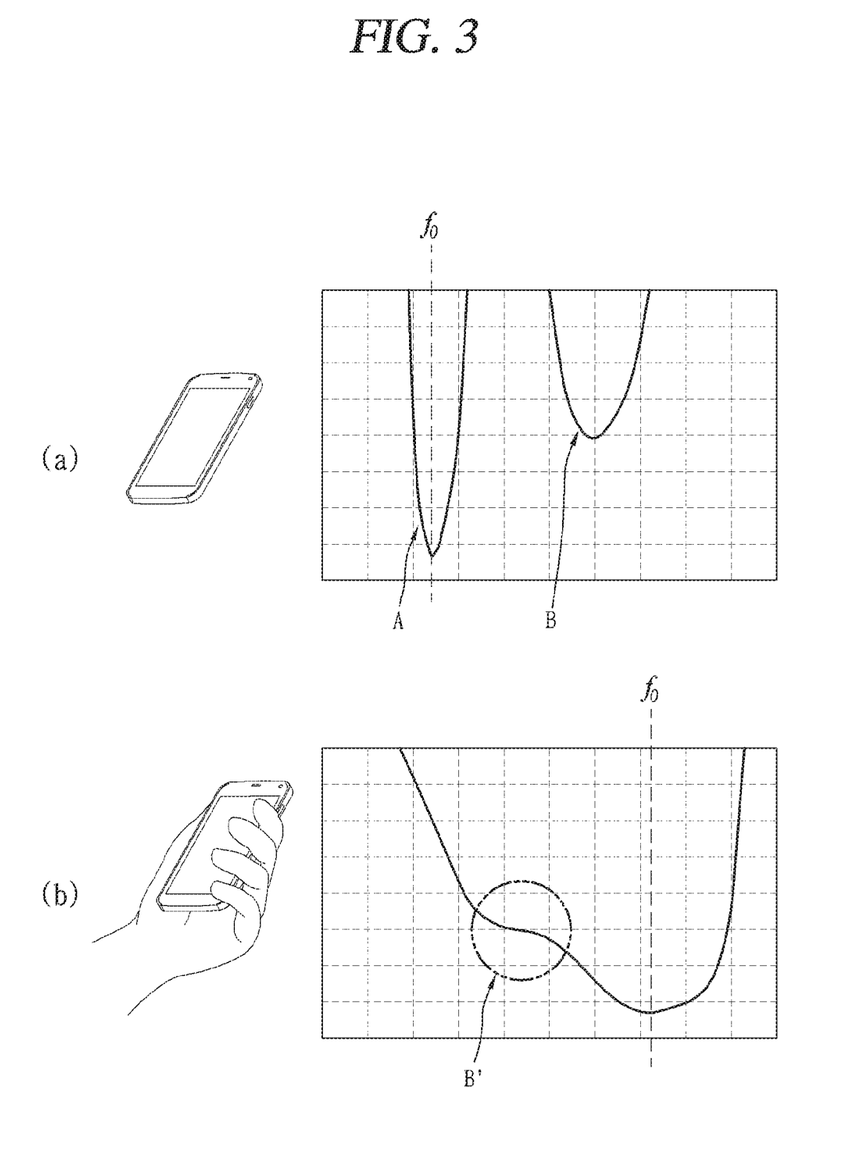
FIG. 3 is a conceptual view illustrating changes in frequency bands according to an embodiment of the present invention.

Next, FIG. 3 is a conceptual view illustrating changes in frequency bands according to an embodiment of the present invention. Referring to FIGS. 2B and 3, the first metal member 105 and the first antenna unit 210 will be described as an example. The first antenna unit 210 is disposed in the lower end of the mobile terminal 100 and the antenna pattern of the first antenna unit 210 is disposed adjacent to the first metal member 105. The antenna pattern of the first antenna unit 210 and the first metal member 105 has a narrow distance therebetween, and accordingly, resonance generated in the first metal member 105 may interfere with resonance of the first antenna unit 210.

One area of the first metal member 105 adjacent to the first antenna unit 210 is grounded to the frame 104 by the first to third connecting members 311, 312 and 313, and resonates at a specific frequency band due to a length of a physical and electric transmission line, which has been set by adjusting sizes of inductors and capacitors included in the plurality of LC matching elements 301.

(a) of FIG. 3 illustrates an object such as a hand is not present near the mobile terminal 100, that is, when there is no object that affects the radiation of the first antenna unit 210. In this instance, the resonance is generated at a first frequency band A set by the antenna pattern of the first antenna unit 210. The first frequency band A includes an in-band (user frequency) fo that is designated for the first antenna unit 210 to perform a specific function.

The first metal member 105 resonates at a second frequency band B by the first to third connecting members 311, 312 and 313 and the plurality of LC matching elements 301. The second frequency band B is decided by a physical length of the first metal member 105 grounded by the first to third connecting members 311, 312 and 313 and an electric length formed by the LC matching elements 301. The second frequency band is not included in the first frequency band.

In addition, the resonance of the second frequency band corresponds to a parasitic resonance that is irrespective of the function of the first antenna unit 210. However, since the second frequency band B is not included in the first frequency band A, even if the parasitic resonance is generated due to the first metal member 105, the parasitic resonance does not affect the resonance function of the first antenna unit 210. Therefore, the affection due to the parasitic resonance with respect to the first metal member 105 can be minimized.

Further, FIG. 3 illustrates that the second frequency band B is higher than the first frequency band A, but the present invention is not limited thereto. For example, the second frequency band B corresponding to the parasitic resonance can be set to be lower than the first frequency band A.

In addition, referring to (b) of FIG. 3, when a hand or other object (a dielectric) is present near the mobile terminal 100, resonance is generated at a third frequency band B' where a frequency band shift is buffered. When a dielectric is disposed adjacent to the mobile terminal 100, for example, when the user holds the terminal body by their hand (when a dielectric such as a hand touches the first metal member 105), the second frequency band B, namely, the parasitic resonance, of the first metal member 105 is shifted (changed) to be close to the first frequency band A, so as to form the third frequency band B' mixed with the first frequency band A. The third frequency band B' has an extended resonant band width and includes the first frequency band and the in-band fo.

Figure 4:
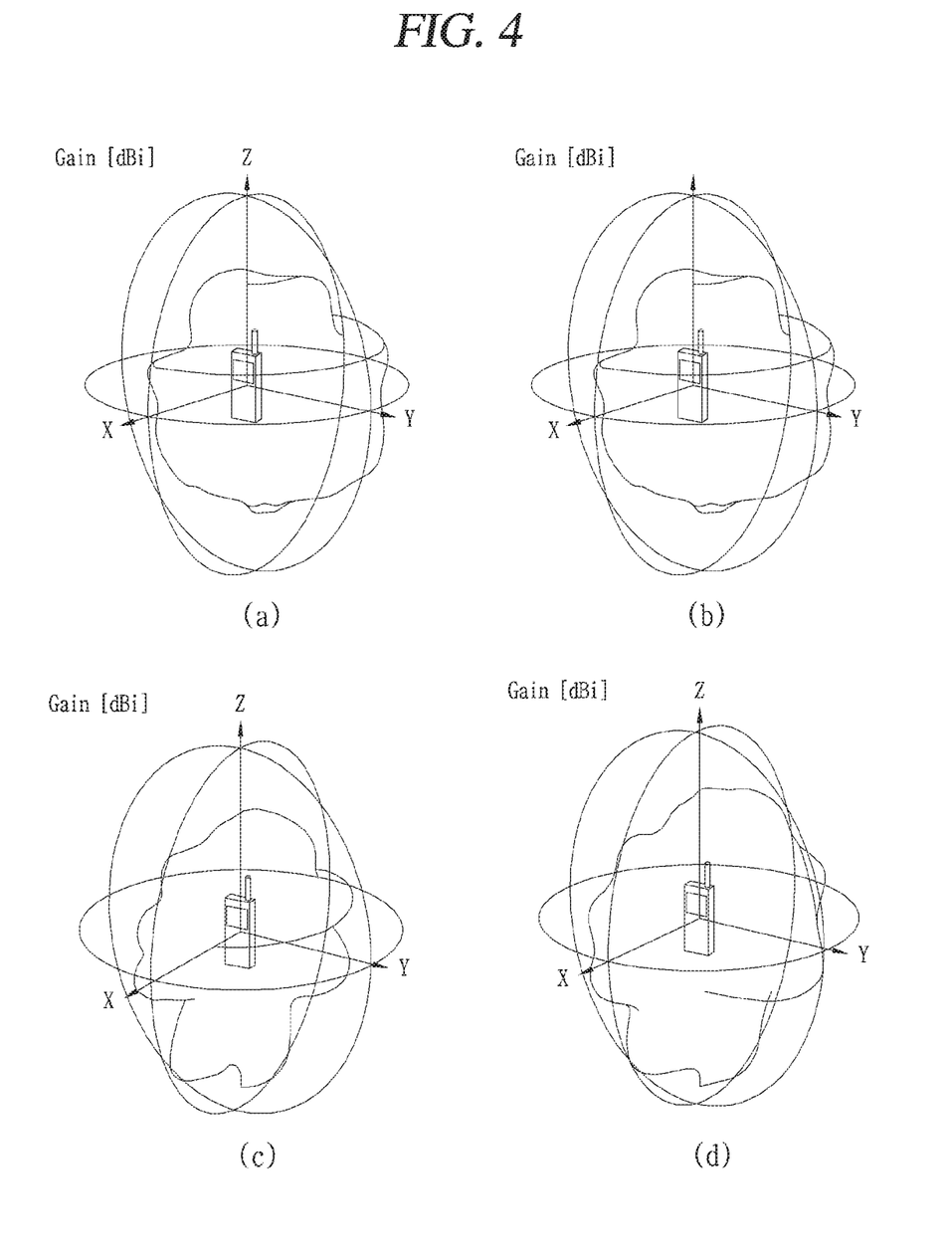
FIG. 4 is a view illustrating angles of radiation patterns.

Next, FIG. 4 is a view illustrating angles of radiation patterns. In particular, (a) of FIG. 4 illustrates a radiation pattern when there is no first metal member 105 that generates the parasitic resonance in the absence of the affection of the dielectric, and (b) of FIG. 4 illustrates a radiation pattern when there is the first metal member 105 that generates the parasitic resonance in the absence of the affection of the dielectric. Without the affection of the dielectric, not only the change in the radiation pattern but also degradation in the performance of a main resonance of the first antenna unit 210 due to the parasitic resonance of the first metal member 105 are rarely caused. In those drawings, a first area shows better radiation and a second area shows less radiation.

In addition, (c) of FIG. 4 illustrates a radiation pattern when there is no first metal member 105 that generates the parasitic resonance under the affection of the dielectric, and (d) of FIG. 4 illustrates a radiation pattern when there is the first metal member 105 that generates the parasitic resonance under the affection of the dielectric. If the dielectric is adjacent to the mobile terminal 100, a peak angle of the radiation pattern is changed when the first metal member 105 is present, and accordingly the antenna performance can be improved.

Referring back to FIG. 2B, the fourth antenna unit 240 includes one area of the first metal member 105 fed by a first feeder 411 as an antenna pattern, and the fifth antenna unit 250 includes one area of the second metal member 106 fed by a second feeder 412 as an antenna pattern.

Figure 5:
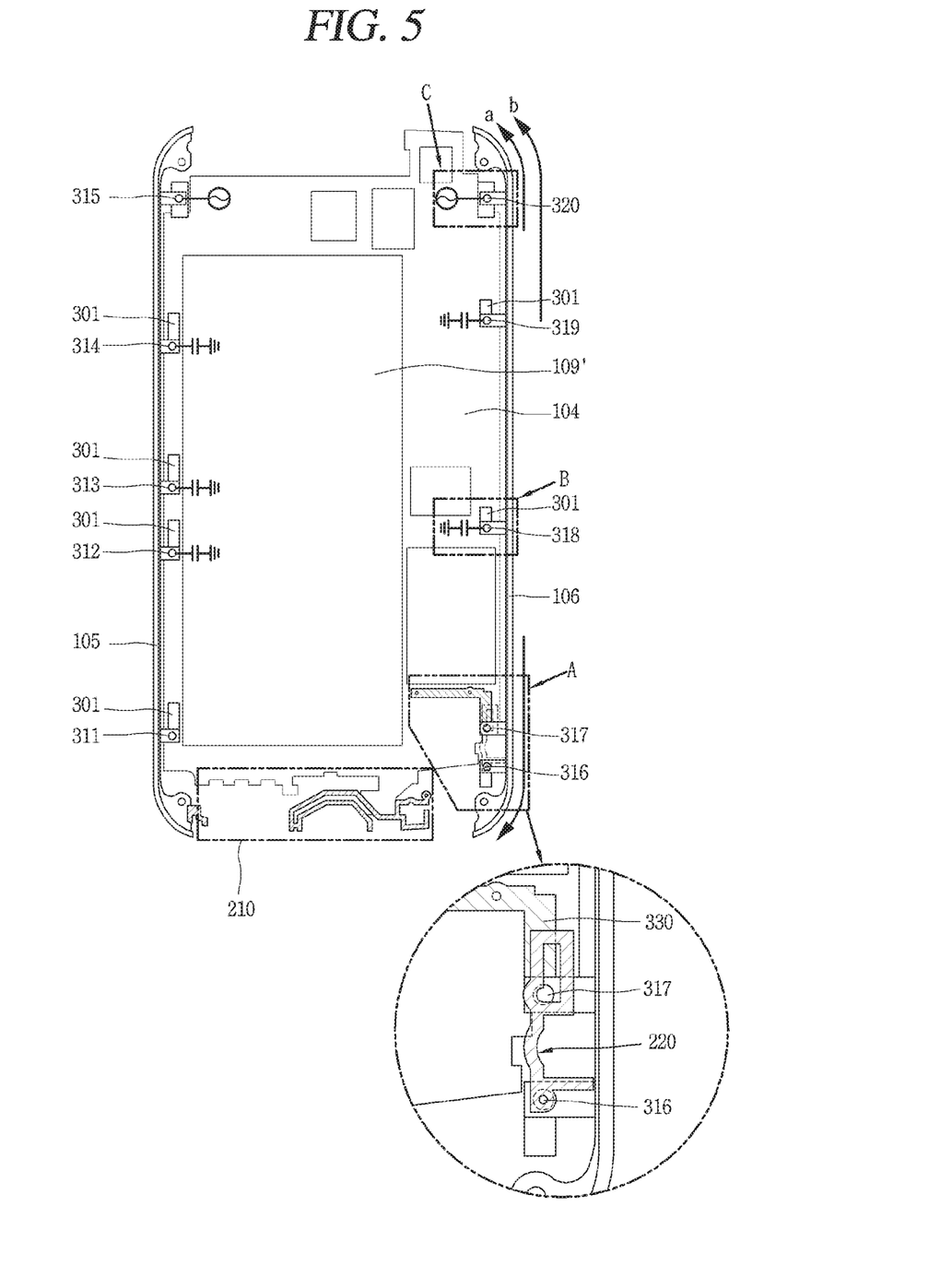
FIG. 5 is a conceptual view illustrating a second metal member adjacent to a second antenna unit and a fifth antenna unit.

Next, FIG. 5 is a conceptual view illustrating a second metal member adjacent to a second antenna unit and a fifth antenna unit. Referring to FIGS. 2A and 5, the second antenna unit 220 is disposed adjacent to the second metal member 106. One area of the second metal member 106 adjacent to the second antenna unit 220 is grounded to the frame 104 by the sixth, seventh, and eighth connecting members 316, 317 and 318.

The antenna pattern included in the second antenna unit 220 resonates at a first frequency band including a user frequency (in-band). Further, the sixth to eighth connecting members 316, 317 and 318 are spaced apart from one another at specific intervals so that one area of the second metal member 106 resonates at a second frequency band different from the first frequency band. The eighth connecting member 318 is electrically connected to an LC matching element 304 (FIG. 6B) and a flexible printed circuit board 330 is connected to the seventh connecting member 317.

Figure 6A:
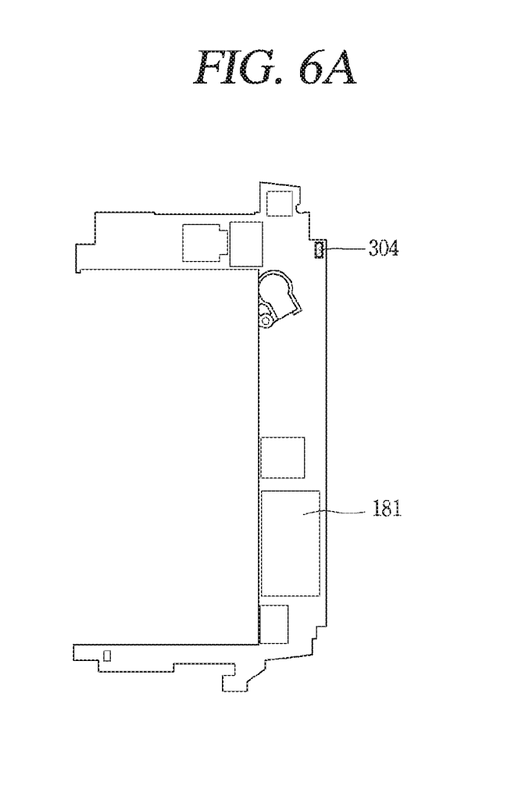
FIGS. 6A and 6B are conceptual views illustrating a part A of FIG. 5.
Figure 6B:
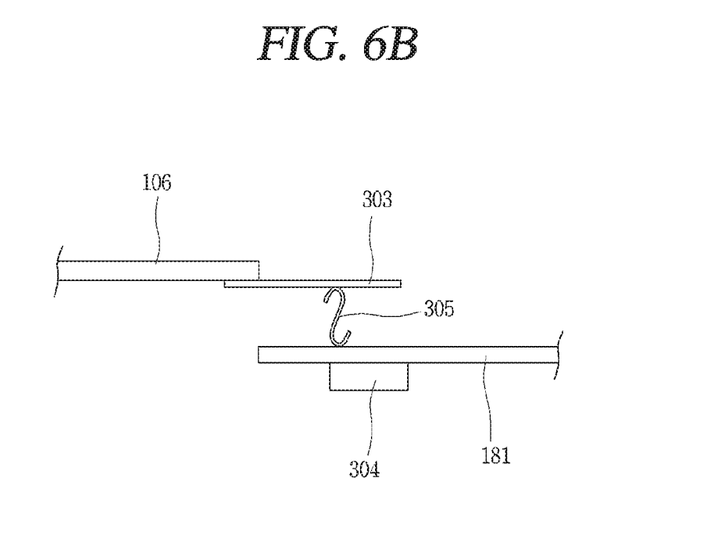

Next, FIGS. 6A and 6B are conceptual views illustrating a part A of FIG. 5. Referring to FIGS. 5, 6A and 6B, the eighth connecting member 318 is electrically connected to the LC matching element 304 mounted on the main printed circuit board 181. A connecting circuit board 303 is mounted on the eighth connecting member 318 and electrically connected to the LC matching element 304 of the main circuit board 181.

In addition, a connection pin 305 connects the main circuit board 181 and the connecting circuit board 303 which overlap each other. Here, the LC matching element 304 mounted on the main circuit board 181 is substantially the same as the LC matching element 301 of FIG. 2B. According to this embodiment, any additional space is not required for disposing the LC matching element.

Figure 7A:
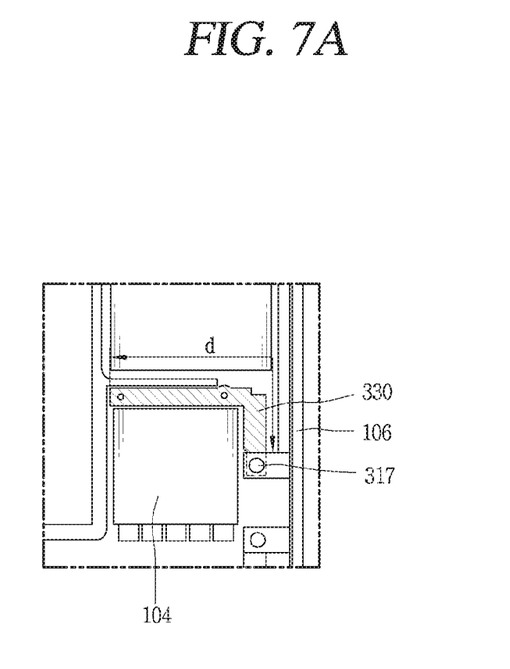
FIG. 7A is an enlarged view of a part B in FIG. 5.
Figure 7B:
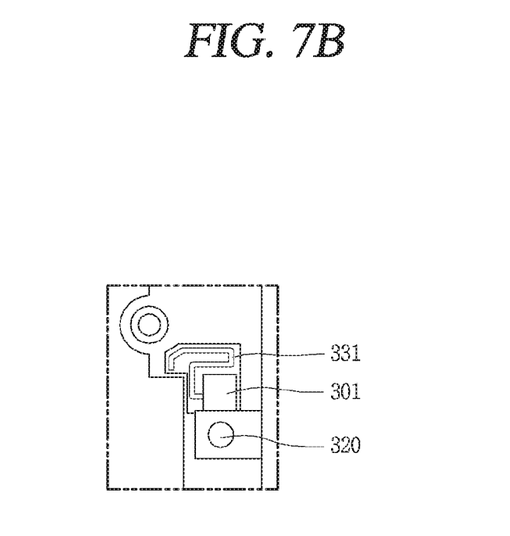
FIG. 7B is an enlarged view of a part C in FIG. 5.

Next, FIG. 7A is an enlarged view of a part B in FIG. 5, and FIG. 7B is an enlarged view of a part C in FIG. 5. Referring to FIGS. 5 and 7A, the flexible printed circuit board 330 extends from the seventh connecting member 317 by a specific length d. Here, the specific length d corresponds to a length for forming a physical transmission line by which the second metal member 106 having the sixth to eighth connecting members 316, 317 and 318 mounted thereto and grounded to the frame 104 resonates at the second frequency band.

The flexible circuit board 330 is accommodated in one area of the frame 104. Further, the flexible circuit board 330 is also thin so as to be accommodated in an arbitrary area of the frame 104. In addition, since a length of the flexible circuit board 330 is easily adjusted, the length of the physical transmission line for forming the frequency band of the second metal member 106 can be adjusted.

Therefore, there is no need of an additional connecting member for connecting the frame 104 and the second metal member 106 in order to adjust the length of the physical transmission line resonated at the second frequency band. This facilitates assembling of the components of the mobile terminal 100, and minimizes the thickness and weight of the mobile terminal 100. The shape and length of the flexible circuit board 330 are not limited to those illustrated in the drawings.

Referring to FIGS. 5 and 7B, the second metal member 106 is formed as a part of the radiator constituting the fifth antenna unit 250. A first area of the second metal member 106 adjacent to the fifth antenna unit 250 is connected to the frame by the tenth connecting member 320, and is electrically connected to the second feeder 412 and the antenna pattern of the fifth antenna part 250 by the tenth connecting member 320 so as to form a radiator. The fifth antenna unit 250 can be implemented as a planar inverted-F antenna (PIFA). An antenna resonance with a length a is formed by the tenth connecting member 320.

A second area of the second metal member 106 spaced apart from the first area is connected to the frame 104 by the ninth connecting member 319 and grounded. Accordingly, a resonance, with a length b, of the second frequency band different from the first frequency band of the fifth antenna unit 520 is generated as parasitic resonance. In addition, the LC matching element 301 can be connected to the ninth connecting member 319. An electric length of the transmission line of the fifth antenna unit 250 can be adjusted by the LC matching element 301.

In addition, the tenth connecting member 320 is connected to a flexible circuit board 331 having a specific length. The flexible circuit board 331 having the specific length can adjust the physical length of the transmission line for realizing the resonance of the first frequency band by the sixth metal member 106.

The first to third antenna units 210, 220 and 230 corresponding to the antennas using the low frequency band (about 700 KHz to 1 GHz), among the first to fifth antenna units 210, 220, 230, 240 and 250 of the mobile terminal according to an embodiment of the present invention, have a peak angle of about 90 degrees, and their functions are greatly deteriorated due to the contact with the dielectric, that is, the hand. Therefore, the first and/or second metal members 105 and 106 are disposed adjacent to the first to third antenna units 210, 220 and 230 and one area of the first and/or second metal members 105 and 106 forms the transmission line to resonate at the second frequency band different from the first frequency band. Further, when the dielectric approaches, the transmission line of the first and/or second metal members 105 and 106 is formed so as to be shifted to the first frequency band, which results in minimizing the functional deterioration due to the hand effect.

Figure 8A:
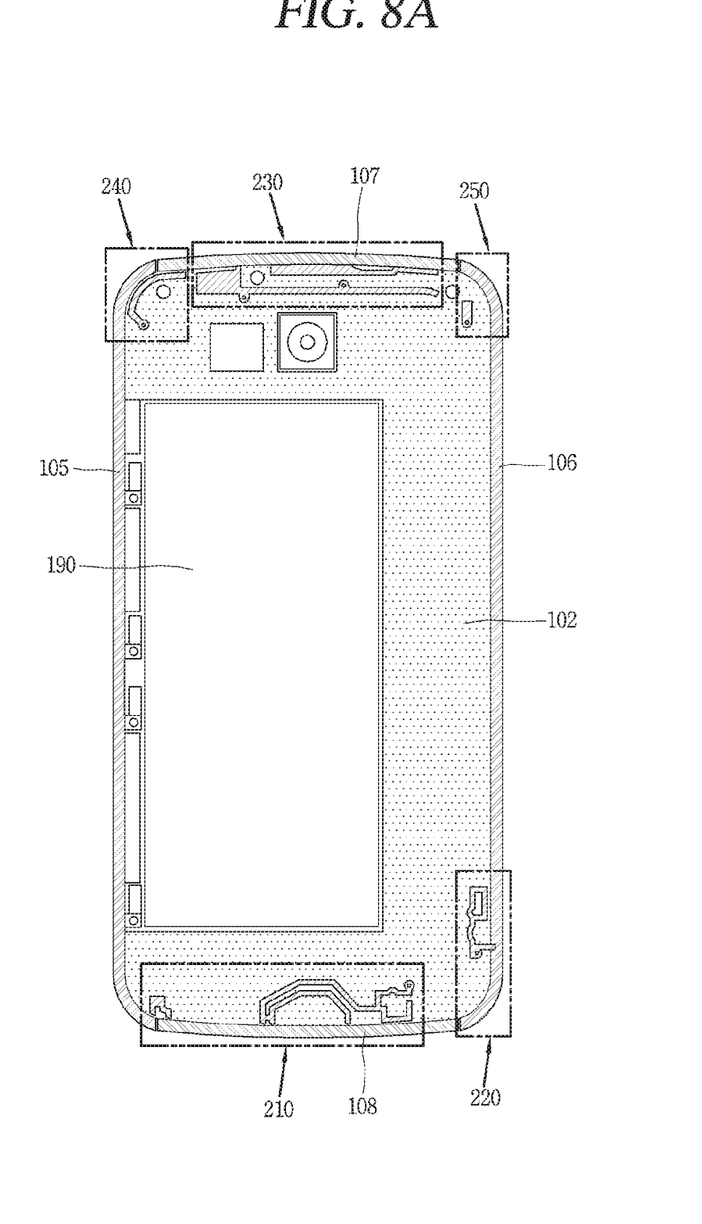
FIGS. 8A and 8B are conceptual views illustrating an arrangement structure of metal members in accordance with another embodiment.
Figure 8B:
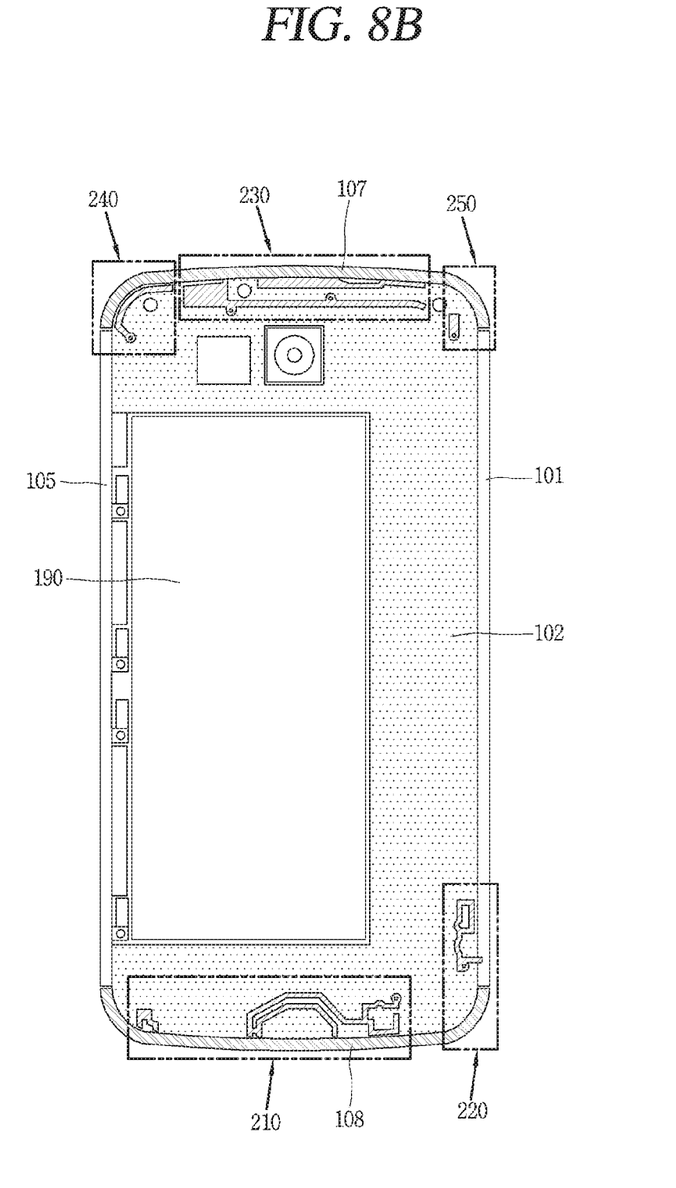

Next, FIGS. 8A and 8B are conceptual views illustrating an arrangement structure of metal members in accordance with another embodiment. The components of the mobile terminal 100 according to these embodiments are substantially the same as those of the mobile terminal 100 of FIGS. 2A to 7B except for the arrangement of the metal members.

The mobile terminal 100 illustrated in FIG. 8A includes first and second metal members 105 and 106 facing each other, and third and fourth metal members 107 and 108 facing each other, all disposed on side surfaces of the terminal body. The first to fourth metal members 105, 106, 107 and 108 may be integrally formed or may not be electrically connected.

The first to fourth metal members 105, 106, 107, and 108 can generate parasitic resonance by resonances of adjacent antenna units, and can be grounded to the frame 104 by a plurality of connecting members. The first to fourth metal members 105, 106, 107 and 108 can be grounded to the frame 104 to generate the parasitic resonance at a second frequency different from a first frequency of the antenna units, and be electrically connected to a flexible circuit board extending by a specific length and an LC matching element.

The mobile terminal 100 illustrated in FIG. 8B includes third and fourth metal members 107 and 108 disposed to face each other in a lengthwise direction. The third and fourth metal members 107 and 108 can be grounded to the frame 104 to generate parasitic resonance at a second frequency band different from a first frequency band of adjacent antenna units, and be electrically connected to the flexible circuit board extending by a specific length and an LC matching element.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal.

Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a terminal body having a display unit disposed on one surface thereof;
   a frame supporting the display unit;
   a metal member spaced apart from the frame and exposed to an outside of the mobile terminal;
   a plurality of connecting members connecting the metal member to the frame and grounding the metal member; and
   an antenna unit disposed adjacent to the frame and including a radiator configured to radiate wireless signals in a first frequency band,
   wherein the metal member is divided into specific areas by the plurality of connecting members, and one area located adjacent to the radiator, is configured to generate a parasitic resonance at a second frequency band different from the first frequency band, and
   wherein the plurality of connecting members connected to the metal member are spaced apart from one another at different intervals.

2. The mobile terminal of claim 1, wherein a frequency band of the antenna unit is shifted to a third frequency band including the first frequency band by the metal member and the radiator when a dielectric is placed adjacent to the metal member.

3. The mobile terminal of claim 1, wherein a frequency band at which the metal member resonates is changed from the second frequency band to be close to the first frequency band, when the dielectric is placed adjacent to the metal member.

4. The mobile terminal of claim 1, further comprising:
   an LC matching element electrically connected to the plurality of connecting members to change an electric length of a transmission line of the one area of the metal member adjacent to the antenna unit.

5. The mobile terminal of claim 4, further comprising:
   a main circuit board supported by one area of the frame and having the LC matching element mounted thereon;
   a connecting circuit board extending from the frame and overlapping the main circuit board; and
   a connection pin connecting the connecting circuit board and the main circuit board.

6. The mobile terminal of claim 4, wherein the LC matching element is mounted on one area of a case, adjacent to the metal member, the case constituting the terminal body.

7. The mobile terminal of claim 1, further comprising:
   a flexible circuit board disposed on the frame, and extending from a corresponding connecting member to have a specific length so that the one area of the metal member is configured to generate the parasitic resonance at the second frequency band.

8. The mobile terminal of claim 1, wherein the metal member is disposed on a side surface of the terminal body.

9. The mobile terminal of claim 7, wherein the metal member comprises a pair of metal beams disposed on both side surfaces of the terminal body facing each other.

10. The mobile terminal of claim 1, wherein a first area of the metal member is electrically connected to a feeder of the antenna unit so that the metal member is configured to resonate at the first frequency band by the first area and the radiator, and
    wherein the plurality of connecting members are fixed to a second area spaced apart from the first area so that the parasitic resonance is generated at the second frequency band by the second area.

11. The mobile terminal of claim 1, wherein the metal member is disposed inside the terminal body without power fed thereto, and resonates at the second frequency band.

* * * * *